A. B. DAVIS.

Car Spring.

No. 1,431. Reissued Mar. 17, 1863.

Witnesses:

Henry Howson

Henry Odesonl

Inventor:

A. B. Davis

A.M. PHOTO-LITHO. CO. N.Y. (OSBORNE'S PROCESS.)

UNITED STATES PATENT OFFICE.

AUGUSTUS B. DAVIS, OF PHILADELPHIA, PENNSYLVANIA.

IMPROVEMENT IN CAR-SPRINGS.

Specification forming part of Letters Patent No. 22,941, dated February 15, 1859; Reissue No. 1,371, dated January 6, 1863; Reissue No. 1,431, dated March 17, 1863.

*To all whom it may concern:*

Be it known that I, AUGUSTUS B. DAVIS, of Philadelphia, Pennsylvania, did obtain Letters Patent of the United States for a new and useful Improvement in Railroad-Car Springs, which Letters Patent bear date the 15th day of February, A. D. 1859; that a description of an improvement was on the 28th day of June, 1859, annexed and added to the said Letters Patent, forming part of the same; that the said Letters Patent, with the additional improvements, were surrendered, and that two new Letters Patent were granted to me on the 6th day of January, 1863, one being marked Reissue No. 1,371, and the other Reissue No. 1,372; that I now deem the said reissued Patent No. 1,371 inoperative and invalid by reason of a defective specification, which defect has arisen from inadvertence or mistake; and I do hereby declare the following to be a full, clear, and exact description of the invention, reference being had to the accompanying drawings, and to the letters of reference marked thereon.

My invention consists, first, of a box of any convenient form, and a plate adapted to the open end of the box and connected to the latter by a bolt or bolts, D, or other suitable fastening, substantially as described hereinafter, in combination with a series or nest of springs, arranged side by side and maintained free from contact with each other, each spring forming an integral part of the entire elastic medium, composed of the whole of the spring, and the latter serving with the said box and plate to constitute an entire self-contained car-spring of a durable character, cheap and simple as regard construction, and smooth and easy in its movements; secondly, in the use within a box, substantially as described, of a series or nest of spiral or coiled springs when made of iron wire and treated by compression or impact prior to being deposited in the box, as set forth, for the purpose specified; thirdly, the series or nest of springs, combined with a box and plate so constructed that the compression of the said springs shall be limited and their constant availability thereby preserved.

In order to enable others skilled in the art to make my invention, I will now proceed to describe the manner of constructing the same.

Figure 2:
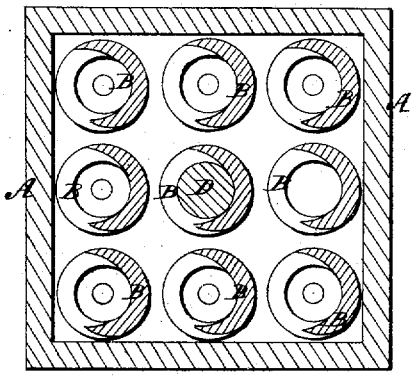
Figure 1:
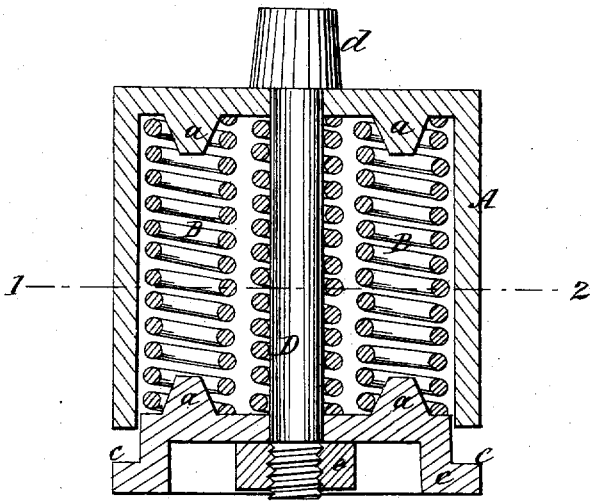

On reference to the accompanying drawings, which form a part of this specification, Figure 1 is a vertical section, and Fig. 2 a sectional plan illustrating a mode of constructing my improved car-springs.

A is a metal box or casing, the form of which may be modified in accordance with the locality in which my improved spring has to be placed, and the duty which it has to perform. One end of the box is open, and to the open end a plate, C, is so adapted that a portion of the said plate can move to and fro freely within the said box, the inward movement of the plate being limited by its flange or projection *c* coming in contact with the end of the box, and the outward movement being limited by a bolt, D, which passes freely through both box and plate, one end of this bolt having a head, *d*, and the other end being furnished with a nut, *e*.

Between the plate C and the closed end of the box are arranged a number of spiral or coiled springs, B, nine such springs only being shown in the present instance as being sufficient to illustrate my invention, whereas in my improved car-springs of ordinary size from twenty to eighty springs are used. The springs are arranged side by side, and are maintained free from contact with each other by the projections *a a* on the closed end of the box, and on the plate C. In confining the springs to the box, the lid is forced against the ends of the springs by turning the nut *e* of the bolt D until the whole of the springs are simultaneously compressed to such an extent only as will suffice to keep them from moving about in the box and becoming displaced.

It will be seen that each spring is separate and distinct from the others, and may be considered an independent spring until the whole are confined between the closed end of the box and the plate C. The moment the springs are thus confined, however, each spring loses its individuality, and, while it contributes its quota to the formation of the entire elastic medium, must be considered an integral part of the same, the box with its nest of springs being a single self-contained car-spring.

A number of very elaborate and careful tests have proved the fact that a car-spring composed of a number of small springs arranged side and side, in the manner described, possesses advantages of the most important character. In the first place, it has been found that my improved spring moves more easily and smoothly under sudden pressure than a single spiral or coiled spring of the same rigidity as that of the whole nest of springs combined. Secondly, my improved springs are more durable than ordinary springs of the same rigidity—an assertion fully borne out by the fact that while ordinary springs are constantly breaking no such accident has occurred to my springs during any of the severe tests to which they have been subjected. A third advantage of my improvement is this: that if one of the springs in the box A becomes impaired or weak, and thereby ceases to perform its duty as an integral part of the whole, the entire car-spring is weakened to such an inconsiderable extent that it continues to perform its proper functions. In this respect my invention possesses a most important advantage over that class of car-springs which are composed of a number of springs, so dependent on each other that when one spring is broken or damaged the entire car-spring becomes useless.

As regard simplicity of construction, it will be evident to those familiar with this branch of manufacture that when compared with other car-springs the advantage is on the side of my invention.

It is advisable that all of the springs contained within the box should be alike, as regard rigidity and length, so that each must perform its appropriate share of the duty to be accomplished by the whole, and in order that there may be as much unity in the action of the combined spring as in an ordinary simple spring.

I prefer to make the springs of simple round wire, coiled round a cylindrical rod, as they are most readily made in this manner. It will be evident, however, that the springs may be coiled or twisted round a tapering rod, so that they will be larger in diameter in one part than the other, as in ordinary cushion-springs. The springs, too, without departing from the main feature of my invention, may be made of square wire or flat steel bars, the same being coiled or twisted, or otherwise bent in whatever manner the constructor may deem most appropriate.

The simple spiral springs which I have illustrated in the drawings, and which I prefer to all others, may be made of steel wire, although I have found ordinary iron wire equally as serviceable, if treated in a proper manner, and much more economical than steel.

In practice, I adopt the following mode of treating the iron wire springs: After the coil has been made and cut to the appropriate length, I compress it either gradually or by impact to the extent or nearly to the extent to which it has to be hereinafter limited. On the removal of the pressure or after the blow imparted to it, the spring will not resume its former length, but on subsequent pressure being applied, or on a subsequent blow being imparted, providing it does not exceed the first in force, the spring will invariably recoil to the extent to which it expanded after the removal of the first pressure; hence the advantage of limiting the compression of the spring in the box by causing the plate C to come in contact with the box when the proper limit of compression has been reached.

The springs may be retained in their proper relative position within the box by recesses formed in the end of the same, and similar recesses formed in the inside of the plate C, said recesses being arranged for the reception of the ends of the springs. I prefer the use of projections, however, of the tapering form represented, or rounded at the top, for the reason that projections of this shape tend to guide the springs to their proper destination when they are applied to the box, and when the plate is applied to the springs and box, at the same time they tend to maintain the springs in a vertical position and prevent injurious lateral sagging.

I do not desire to confine myself to the use of any particular number of springs tc constitute, with the box and plate, the entire self-contained car-spring, as in some instances four or five spiral or coiled springs or springs otherwise bent may suffice in some instances, although in most cases from twenty to eighty springs are, as before remarked, demanded for ordinary use. Neither do I desire to confine myself to the bolt D as a means of confining the plate C and the springs, as some boxes might require more than one bolt or other equivalent fastenings. Neither do I desire to confine myself to the precise form illustrated of the plate C, as it may be made to overlap the box and still have its inward movement limited.

I claim—

1. A box of any suitable form and a plate, C, or its equivalent, adapted to the open end of the said box, and connected to the latter by a bolt or bolts, D, or other suitable fastenings, substantially as set forth, in combination with a series or nest of springs arranged side by side and free from contact with each other, each spring forming an integral part of the entire elastic medium composed of the whole of the springs, and the latter serving with the said box and plate to constitute an entire single self-contained car-spring, as described.

2. The use within a box, substantially as described, of a series or nest of spiral or coiled springs when made of iron wire and treated by compression or impact prior to being deposited in the box, as set forth, for the purpose specified.

3. The series or nest of springs, combined with a box and plate so constructed that the compression of the said springs shall be limited and their constant availability thereby preserved.

In testimony whereof I have signed my name to this specification before two subscribing witnesses.

A. B. DAVIS.

Witnesses:
HENRY HOWSON,
JOHN WHITE.